Feb. 14, 1950 R. E. APPEL 2,497,200
QUIZ DEVICE
Filed May 24, 1947
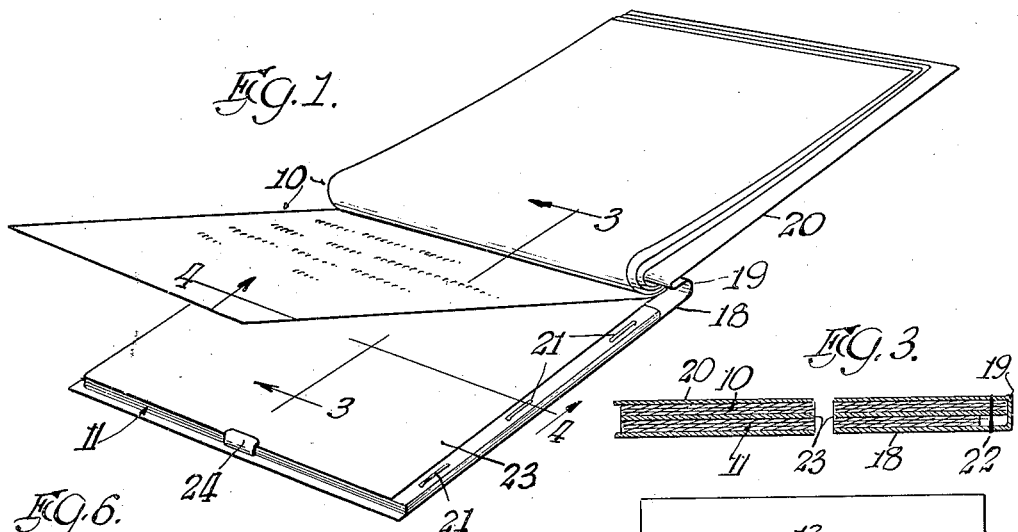
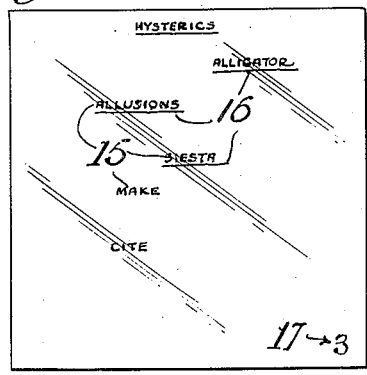
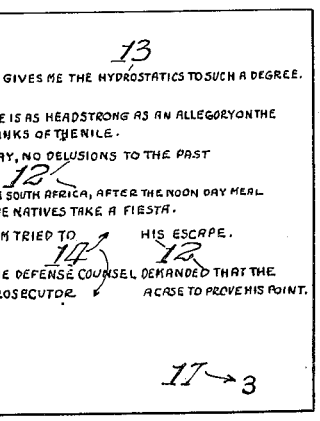
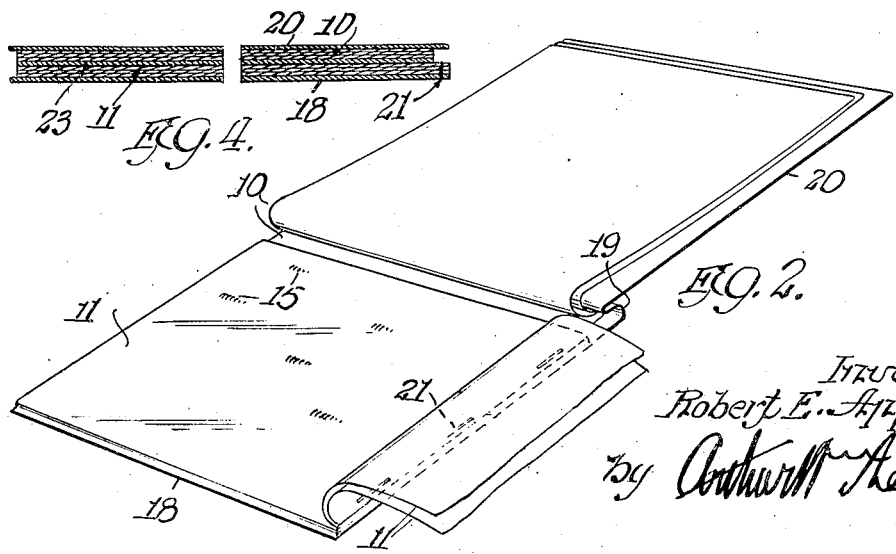
Inventor
Robert E. Appel Patented Feb. 14, 1950

2,497,200

UNITED STATES PATENT OFFICE 2,497,200

QUIZ DEVICE

Robert E. Appel, Chicago, Ill.

Application May 24, 1947, Serial No. 750,240

4 Claims. (Cl. 35—35)

This invention relates to improvements in quiz devices and it consists of the matters hereinafter described and more particularly pointed out in the appended claims.

One of the objects of the invention is to provide a device by which a person may take a quiz requiring the revision of certain statements, questions or other matters, arranged on some of the sheets of the device and thereafter receive a quick and accurate check of the revisions made on said sheets by associating said first mentioned sheets and other sheets so that one is superimposed upon the other.

Another object of the invention is to provide a device of this kind, which is of simple construction enabling production at low cost, which has an entertaining and instructive value, and which is useful in determining the ability, aptitude, knowledge and observance of the person using the device.

It is an object of the invention to provide means whereby the examinee may himself re-read the question or matter requiring revision, read his inscribed response and read the printed correct answer directly by means of associated sheets, at least one of which is transparent.

Also, it is an object of the invention to provide a device of this kind requiring written or inscribed revisions of matter forming a part thereof and which matter, when revised, may be quickly and easily checked for accuracy either by the person making the revision or by some other person.

The above mentioned objects of the invention, together with others, will more fully appear as the specification proceeds.

In the drawings:

Fig. 1 is a perspective view of a quiz device embodying the invention, when made up in book form, with certain of the statement sheets shown as turned back from their closed position, better to show the arrangement of the associated revision sheets and covering and sealing sheet for the latter.

Fig. 2 is a view similar to Fig. 1, showing one of the revision sheets of the device arranged in a superposed relation upon an associated statement sheet of the device.

Fig. 3 is a longitudinal sectional view through a book form of the invention when in a closed condition and on an exaggerated scale, as taken on the line 3—3 of Fig. 1.

Fig. 4 is a transverse sectional view through the device of Fig. 1 when the device is in its closed condition, as taken on the line 4—4 of Fig. 1 and on the scale of Fig. 3.

Fig. 5 is a face view of one of the statement sheets or pages of the devices, and which will be more fully referred to later.

Fig. 6 is a face view of one of the revision sheets or pages of the device, and which will be more fully referred to later.

In general, the improved device may be made in several different forms, but in any form must include at least two associated sheets, one of which is substantially transparent. One of said sheets has indicia thereon in the form of questions or complete statements having correctable errors in some of the areas thereof or incomplete statements, by reasons of blank spaces therein and in which must be inscribed matter such as words, figures and the like, as are necessary to complete the incomplete or inaccurate statements, or other matter. The other of said sheets has disposed in certain of its areas the correct revision matter which will register with the areas or blank spaces of the said one of said sheets so that when the sheet, which is substantially transparent, is superposed on the other sheet, the latter is visible therethrough and a quick and accurate check of the matter inscribed by the user upon said one of said sheets may be made.

Preferably the sheet containing the matter to be revised is made of opaque material and that sheet of the device is hereinafter conveniently termed the "Statement" sheet. The other sheet, which is made of transparent material, is hereinafter conveniently termed the "Revision" sheet.

The preferred embodiment of the invention is one wherein there is a revision sheet for and associated with each statement sheet, and these sheets, which are disposed in normally separated sets, are employed in connection with a supporting or backing sheet. A cover for the device may be provided so that the sets of sheets are disposed between the backing sheet and the cover and are protected thereby. The backing and cover sheets are preferably thicker and stiffer than the statement and the revision sheets.

If desired, but not necessarily so, the device may include a covering and sealing sheet disposed between the set of statement sheets and the set of revision sheets so as to segregate them. Also, the latter set of sheets is preferably sealed to the covering sheet by a breakable seal.

Referring now in detail to that embodiment of the invention illustrated in the drawings, the improved quiz device includes a set of statement sheets 10, one of which appears in Fig. 5 and a set of revision sheets 11, one of which appears in Fig. 6, there being one revision sheet for association with each statement sheet of the device. Preferably each statement sheet, which is preferably made of opaque paper, is longer and narrower than each revision sheet, which is preferably made of a transparent sheet material, such for example as a good grade of tracing paper.

Each statement sheet 10 bears suitable indicia or other matter thereon requiring revision. As shown, this matter is in the form of statements 12—12 in inscribed lines extending across the sheet. In the statement sheets, certain words may be erroneously used as at 13 and blank spaces 14 may be provided, in which the user may insert the missing matter.

Each revision sheet 11 bears thereon certain revision matter (in this instance "words") 15 preferably in a color different from that used for the statements, etc. on the statement sheets. Said matters are so disposed in areas or portions of the revision sheet that when said sheet is superposed upon an associated statement sheet 10, these areas or portions will occupy a position over the areas or portions 13 and 14 of the associated statement sheets. Where the revision matter is of such character as to correct an error in spelling, or misuse of a word, such revision matter preferably includes a deletion or strike-out line 16, as appears in the upper portion of Fig. 6. When the sheets are superposed, as before mentioned, said line will delete the error and show the correct or proper word thereabove. When such revision matter registers with a blank space 14 on the associated statement sheet, there is, of course, no necessity for the use of the strike-out line 16.

Preferably each associated statement and revision sheet bears, in a convenient, out-of-the-way place, the same identifying character 17.

The sets of sheets 10 and 11 are preferably employed in connection with a back member 18 of relatively stiff paper and which, at one end, has a cover 20 connected thereto by means of a hinge 19. By reason of the hinge, the cover 20 may be swung from the closed position of Fig. 3 to the open position of Fig. 1 and vice versa. It is preferred that the back, the cover and the hinge be made from the same piece of stock, but this is not absolutely necessary so far as the invention is concerned.

A set of the revision sheets 11 is disposed upon the back member 18 and one lateral margin of this set is attached to one lateral margin of the back, as by means of staples 21 that appear in Figs. 1 and 4. When so attached the top ends of the revision sheets terminate short of the hinge 19, as best appears in Figs. 1 and 2.

A set of the statement sheets 10 is disposed with the upper end margin engaged in the hinge 19 and is then fixed thereto by the staples 22 which best appear in Fig. 3. When so fixed in place, the bottom edge and one side edge of the statement sheets will coincide with the like edges of the revision sheets and the other side edge of the statement sheets will be spaced inwardly from the similar edges of the revision sheets to expose that lateral margin of the latter sheets that are stapled to the back member 18.

If desired, an opaque covering sheet 23 may be arranged between the sets of statements and revision sheets 10 and 11 and this covering sheet is fixed at its upper margin, in the hinge 19 by the staples 22, before mentioned. A breakable seal 24 (see Fig. 1) fastens the bottom margins of the revision sheets 11 to the like margin of the covering sheet 23 to discourage using the revision sheets for checking purposes until each and every statement sheet has been revised by the user.

In the use of the device, the user revises the statement sheets in their consecutive order and when said revision has been completed, the seal 24 is then broken to unseal the revision sheets. After the cover 20 has been folded back, a lifting of the covering sheet 23 will permit the first revision sheet to be opened or hinged along its fixed margin to free it from the others. The covering sheet 23 and the statement sheets are swung back toward and into engagement upon the remainder of the revision sheets and this brings the first statement sheet in its revised condition, uppermost. The first revision sheet is then swung back to overlie and be superposed upon the first statement sheet so that the revision matter or indicia 15 and 16 thereon will register with the errors 13 and blank spaces 14 of the first statement sheet therebeneath. As the revision sheets 11 are transparent the indicia on the statement sheet is visible therethrough and as the revision matter is of a different color than the indicia on the statement sheet, it will readily contrast therewith and enable a quick and accurate check of the revisions made by the user on the associated statement sheet.

After the first statement sheet has been checked, as described, the others may, likewise, be checked in succession.

The improved device has an educational, as well as an entertaining value. It is of simple construction so that it may be produced at low cost, and also may be readily used and understood by persons of ordinary intelligence.

The improved device is also of advantage for use in classroom work in schools and the like since it permits the instructor quickly to grade the students using the same.

While in describing the invention I have referred in detail to the form and arrangement of the parts involved in the preferred form of the device, the same is to be considered only in the illustrative sense and therefore I do not wish to be limited thereto except as may be specifically set forth in the appended claims.

I claim as my invention:

1. A quiz device embodying therein a supporting backing sheet, a set of substantially opaque statement sheets and a set of substantially transparent revision sheet, there being a revision sheet for association with each statement sheet, the set of statement sheets being fixed along one margin to a part of the backing sheet and the set of revision sheets being fixed along one margin to another part of the backing sheet, each sheet of each set being swingable about its fixed margin so that any revision sheet may be disposed in superposed relation upon its associated statement sheet, each statement sheet having indicia thereon, certain portions of which are arranged for revision by the user, each revision sheet having in certain areas thereof revision portions that are arranged substantially to register with said portions of the associated statement sheet when superposed thereon, thereby affording a direct visual comparison of the revisions made by the user in said portion of the indicia on the statement sheet, with the pertinent revision matter on the revision sheet.

2. A quiz device embodying therein a supporting backing sheet, a set of opaque statement sheets and a set of substantially transparent revision sheets, there being a revision sheet for association with each statement sheet, the sheets of one set being fixed along one margin to a part of the backing sheet and the sheets of the other set being fixed along one margin to another part of the backing sheet, a separating sheet arranged between the set of statement sheets and the set of revision sheets, means providing a seal connection between said separating sheet and the sheets in the set of revision sheets and adapted to be broken, for a release of the revision sheets, after said statement sheets have been revised by the user, each sheet in each set being swingable about its fixed margin to permit superposing it upon the associated sheet in the other set, each statement sheet having indicia thereon, certain portions of which are arranged for revision by the user, each revision sheet having in certain areas thereof revision portions that are arranged substantially to register with said portions of the associated statement sheet when said revision sheet is in direct contact with its associated statement sheet, said revision sheet affording a direct visual comparison of the revisions made by the user in said portion of the indicia on the associated statement sheet, with the pertinent revision matter on the revision sheet.

3. A quiz device embodying therein a supporting back sheet, a set of substantially opaque statement sheets and a set of transparent revision sheets that are wider and shorter than the statement sheets, means for securing a lateral margin of the set of revision sheets to a lateral margin of the back sheet, means for securing an end margin of the set of statement sheets to the back sheet along a line transversely of said lateral margin of the back sheet and in overlying relation upon the set of revision sheets while exposing said lateral margin thereof and with an end margin of the revision sheets arranged short of said end margin of the statement sheets whereby the revision sheets may be manipulated each to overlap an associated statement sheet, said statement sheets each having indicia thereon, certain portions of which are arranged for revision by the user, said revision sheets having in certain areas thereof revision portions that are arranged substantially to register with said portions of the statement sheets when a revision sheet is superposed upon an associated statement sheet so that the latter is visible through the revision sheet, thereby affording a direct visual comparison of the revisions made by the user in said portions of the indicia on statement sheet therebeneath, with the pertinent overlying matter on the revision sheet.

4. A quiz device embodying therein a supporting back sheet, a set of substantially opaque statement sheets and a set of transparent revision sheets that are wider and shorter than the statement sheets, means for securing a lateral margin of the set of revision sheets to a lateral margin of the back sheet, means for securing an end margin of the set of statement sheets to the back sheet along a line transversely of the backing sheet and in overlying relation to the set of revision sheets while exposing said margin thereof and with an end margin of the revision sheets arranged short of said end margin of the statement sheets whereby the revision sheets may be manipulated each to overlap an associated statement sheet, said statement sheets each having indicia thereon, certain portions of which are arranged for revision by the user, said revision sheets having in certain areas thereof revision portions that are arranged substantially to register with said portions of the statement sheets when a revision sheet is superposed upon an associated statement sheet so that the latter is visible through the revision sheet, thereby affording a direct visual comparison of the revisions made by the user in said portions of the indicia on statement sheet therebeneath, a covering sheet arranged between said sets of sheets and fixed at one end to the back sheet, and means for sealing a margin of the set of revision sheets to a margin of the covering sheet.

ROBERT E. APPEL.

REFERENCES CITED

The following references are of record in the file of this patent:

UNITED STATES PATENTS

| Number | Name | Date |
| --- | --- | --- |
| 1,163,184 | Thompson | Dec. 7, 1915 |
| 1,253,908 | Thompson | Jan. 15, 1918 |
| 1,510,110 | Schmidt | Sept. 30, 1924 |
| 2,137,736 | Watkins | Nov. 22, 1938 |
| 2,213,225 | Maggioni | Sept. 3, 1940 |